(12) United States Patent
Heurtaux et al.

(10) Patent No.: US 9,073,622 B2
(45) Date of Patent: Jul. 7, 2015

(54) INTERMEDIATE ACOUSTIC SKIN AND THE IMPLEMENTATION THEREOF

(71) Applicant: AIRCELLE, Gonfreville l'orcher (FR)

(72) Inventors: Didier Heurtaux, Le Havre (FR); Francois William Vincent Petit, Gonfreville l'orcher (FR); Sebastien Rene Jean Robinet, Montiviller (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/220,671

(22) Filed: Mar. 20, 2014

(65) Prior Publication Data

US 2014/0202789 A1 Jul. 24, 2014

Related U.S. Application Data

(63) Continuation of application No. PCT/FR2012/052026, filed on Sep. 11, 2012.

(30) Foreign Application Priority Data

Sep. 21, 2011 (FR) ...................................... 11 58388

(51) Int. Cl.
*E04B 1/86* (2006.01)
*G10K 11/172* (2006.01)
*B64C 1/40* (2006.01)

(52) U.S. Cl.
CPC ............... *B64C 1/40* (2013.01); *Y10T 428/192* (2015.01); *G10K 11/172* (2013.01)

(58) Field of Classification Search
CPC .................................. G10K 11/172; E04B 1/86

USPC ............................................ 181/292, 290, 284
See application file for complete search history.

(56) References Cited

U.S. PATENT DOCUMENTS

| 3,734,234 | A | | 5/1973 | Wirt |
|---|---|---|---|---|
| 5,882,756 | A | * | 3/1999 | Alston et al. ..................... 428/63 |
| 6,202,786 | B1 | * | 3/2001 | Pfaffelhuber et al. ......... 181/286 |
| 6,209,679 | B1 | * | 4/2001 | Hogeboom et al. .......... 181/286 |
| 6,355,203 | B1 | * | 3/2002 | Charmes et al. .............. 264/493 |
| 7,875,141 | B2 | * | 1/2011 | Bogue et al. ..................... 156/98 |
| 8,646,574 | B2 | * | 2/2014 | Drevon et al. ................. 181/292 |
| 2001/0017232 | A1 | | 8/2001 | Hogeboom et al. |
| 2004/0163888 | A1 | | 8/2004 | Johnson |
| 2005/0104245 | A1 | | 5/2005 | Wood |
| 2005/0147790 | A1 | * | 7/2005 | Levavasseur ................. 428/116 |
| 2007/0275212 | A1 | * | 11/2007 | Stadtlander et al. .......... 428/116 |

FOREIGN PATENT DOCUMENTS

| JP | 11019780 | A | 1/1999 |
|---|---|---|---|
| TW | 201024510 | A | 7/2010 |

OTHER PUBLICATIONS

International Search Report issued Oct. 30, 2012 in International Application No.

* cited by examiner

*Primary Examiner* — Forrest M Phillips
(74) *Attorney, Agent, or Firm* — Brinks Gilson & Lione

(57) ABSTRACT

A septum includes two septum plates and the edges of the septum plates are brought into contact at one of the junction edges of the septum plates. In particular, an angle ($\alpha$) between one of the junction edges of the septum plates and one of the sides of the septum plates adjacent to the one of the junction edge is less than 90°.

11 Claims, 2 Drawing Sheets

Fig. 3

INTERMEDIATE ACOUSTIC SKIN AND THE IMPLEMENTATION THEREOF

CROSS-REFERENCE TO RELATED APPLICATIONS

This application is a continuation of International Application No. PCT/FR2012/052026, filed on Sep. 11, 2012, which claims the benefit of FR 11/58388, filed on Sep. 21, 2011. The disclosures of the above applications are incorporated herein by reference.

FIELD

The present disclosure relates to a septum for an acoustic panel. The present disclosure also relates to a single or double acoustic resonator including such a septum.

BACKGROUND

The statements in this section merely provide background information related to the present disclosure and may not constitute prior art.

Aircraft turbojet engines generate a significant noise pollution. There is strong demand for reducing this pollution, especially as turbojet engines in use are becoming increasingly powerful. The design of the nacelle surrounding a turbojet engine contributes considerably to noise pollution reduction.

In order to further improve the acoustic performances of aircrafts, the nacelles are equipped with acoustic panels intended to attenuate noises generated by the turbojet engine as well as vibrations of structures.

As is known, an acoustic panel comprises an acoustic resonator, forming a layer called intermediate layer, said acoustic resonator being enveloped by a so-called "inner" skin and a so-called "outer" skin to form said acoustic panel.

An acoustic resonator generally comprises one or more hollow core structures (commonly called "honeycomb" structures) separated by a multi-perforated porous skin called septum.

Such a septum can be formed of a plurality of rectangular septum plates, the edges of which are brought into contact at a junction edge, said septum plates being generally obtained by cutting strips, for example made of aluminum. The septum may also be constituted of a plurality of glass plates. The septum makes it possible to obtain a better sound absorption.

Single acoustic resonators, composed of a single honeycomb core structure whereon a septum can be fixed, are well known.

Double acoustic resonators, composed of at least two honeycomb core structures enveloping a septum (which may for example be glued to one of the two structures or on both structures), are also well known.

An acoustic panel comprises in particular a single or double acoustic resonator as defined above and forming an intermediate layer of said panel.

An acoustic panel may be single and comprise a single acoustic resonator as defined above and coated, on the one hand, on the outer side thereof, with an outer skin fixed to the nacelle, forming an outer layer of the acoustic panel and, on the other hand, on the inner side thereof, with an inner skin fixed on said inner side, forming an inner layer of the acoustic panel.

A double acoustic panel comprises a double acoustic resonator as defined above, on the inner side of which an inner skin is fixed, forming an inner layer of the acoustic panel, and on the outer side of which an outer skin fixed to the nacelle forms an outer layer of said acoustic panel.

The outer skin of the acoustic panel, called "acoustic" skin, is perforated and permeable to air; it is intended to be exposed to the air flow passing through the inner space of the nacelle and generating the noise to be attenuated.

The inner skin of the acoustic panel, called "solid" skin, is not perforated and it is impermeable to air; it is not in contact with the air flow passing through the inner space of the nacelle.

The term "outer" is used when a member is exposed to the air flow to be acoustically attenuated. The term "inner" refers to a member which is not in contact with said air flow passing through the nacelle.

Such panels make it possible to "trap" the noise and therefore attenuate noise emissions towards the outer space of the nacelle.

In a known manner, a honeycomb core structure can be carried out by assembling a plurality of honeycomb units being in the form of rectangular plates joined together by nodal joints. Each honeycomb unit has a plurality of honeycomb cells.

The junction surface constituted by the surface of contact between the nodal joints of a first honeycomb unit and the nodal joints of a second honeycomb unit is called the junction edge of honeycomb units.

The acoustic properties of the acoustic panel, that is to say its rate of absorption of the noise depending on the frequency and sound level of the noise, depend in part on the junction with the septum of the honeycomb units, which form the honeycomb core structure. The junction at the junction edge of honeycomb units is commonly made using a foaming glue, such as FM 410® glue.

During assembling and firing of an acoustic panel, the septum undergoes thermal expansion with a magnitude different from that of other surrounding materials, due to use of different materials. This induces offsets and disbonds between the junction edges of the rectangular septum plates and the junction edges of the honeycomb units.

After firing, it is therefore necessary to make up for these disbonds, which impacts the acoustic performance of the panel, and delays the process of manufacturing such a panel.

A known solution is to prevent matching a junction edge of a septum plate with a junction edge of honeycomb units during the assembly.

However, this solution only allows for minimizing the disbond effect, without preventing it completely, so that repairs remain indispensable after the firing step.

SUMMARY

The present disclosure provides a septum intended to be associated with at least one honeycomb core structure, the set forming a resonator, and not substantially requiring any repair after the step of firing such a resonator.

The present disclosure also provides an acoustic panel incorporating a resonator comprising a septum according to the present disclosure.

To this end, the present disclosure provides such a septum made up from at least two adjacent plates, the edges of which are brought into contact at least at one junction edge of a septum plate, said septum being remarkable in that at least one angle between a junction edge of a septum plate and one of the adjacent sides thereof is less than 90°.

With this arrangement, one of the junction edges of the septum plates is beveled so as to have an angle with one of the adjacent edges thereof of less than 90°. Upon mounting of such a septum on a honeycomb structure, this feature of the present disclosure makes it possible to lead to an angular offset between a junction edge of honeycomb units and a junction edge of a septum plate.

An advantage of this angular offset is, during the step of firing such a septum integral with at least one honeycomb core structure, to allow a better dispersion of thermal distortions and to avoid a concentration and accumulation of such distortions in a single direction and therefore to avoid disbond and offset between a junction edge of a septum plate and a junction edge of honeycomb units.

Such an arrangement and such an advantage make it possible to overcome problems inherent in the firing of an acoustic panel, which additionally allows for saving time in the manufacturing process, since it is no longer necessary to carry out a repair step after firing the acoustic panel equipped with a septum according to the present disclosure.

Advantageously, at least one angle between a junction edge of a septum plate and one of the adjacent sides thereof is substantially equal to 45°.

With this feature of the present disclosure, adjusting the septum plates is easier and forces are better distributed on each cell of a honeycomb unit.

Furthermore, at least one of the plates making up the septum according to the present disclosure is made of glass, in particular drilled glass.

Moreover, the present disclosure also relates to a single acoustic resonator remarkable in that it comprises a honeycomb core structure on the inner side of which at least one septum according to present disclosure is fixed by connecting means, in particular by gluing.

The present disclosure also relates to a double acoustic resonator comprising a first honeycomb core structure and a second honeycomb core structure, said structures being separated by a septum according to the present disclosure, said septum being fixed to at least one of the honeycomb core structures by connecting means, in particular by gluing.

The present disclosure also relates to an acoustic panel for an aircraft nacelle comprising an acoustic resonator according to the present disclosure on an outer side of which at least one permeable acoustic skin is fixed.

In addition, an acoustic panel according to the present disclosure comprises at least one impermeable solid skin fixed on an inner side of the acoustic resonator according to the present disclosure.

Finally, the present disclosure relates to a nacelle for a turbojet engine comprising an acoustic panel according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Figure 1:
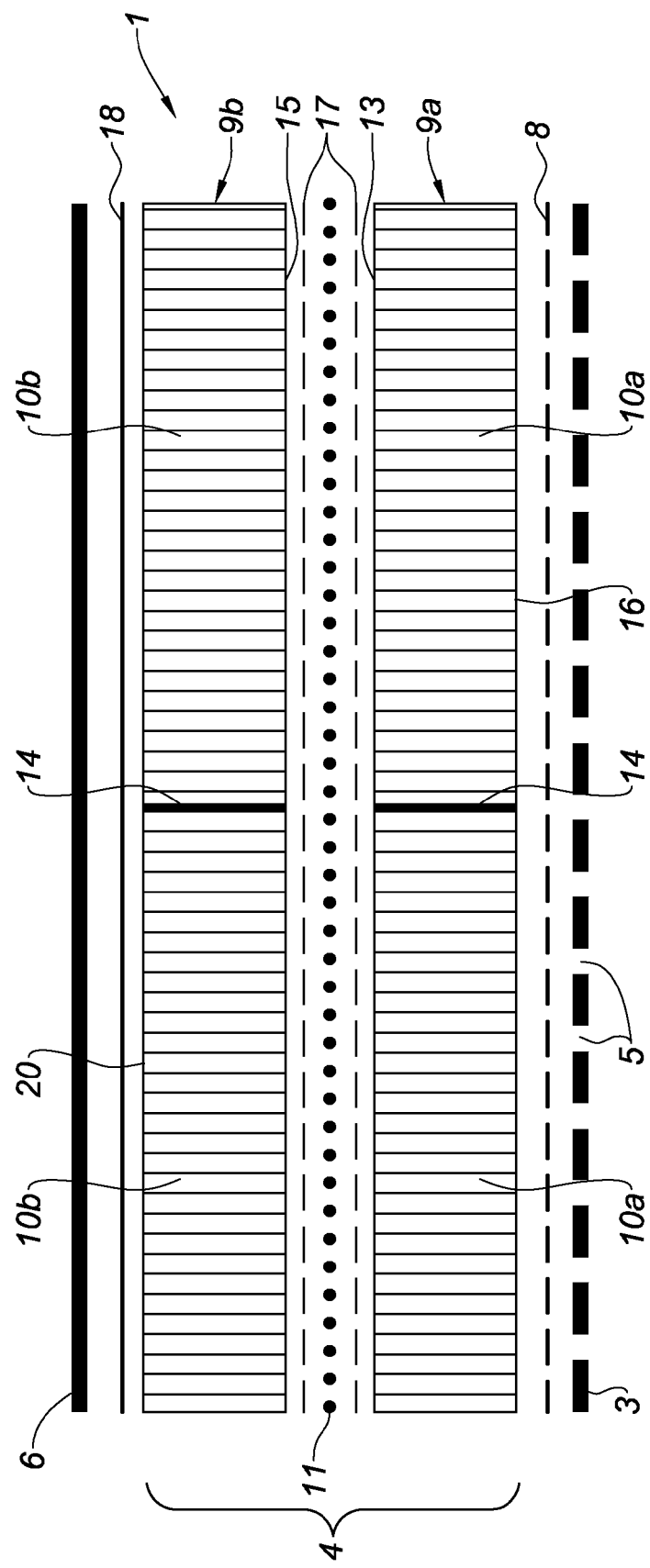
FIG. 1 is a schematic cross sectional view of a double resonator panel.

Referring to FIG. 1, an acoustic panel 1 is composed of a sandwich structure including successively in the thickness direction: a multi-perforated outer skin 3 (acoustic skin), a double acoustic resonator 4 and an inner skin 6 (solid skin).

The outer skin 3 of the acoustic panel 1 is perforated and permeable to air. It forms the outer layer of the acoustic panel 1.

The inner skin 6 of the acoustic panel 1 is not perforated and is impermeable to air. It forms the inner layer of the acoustic panel 1.

The outer skin 3 is perforated with several holes 5 having a small diameter, in particular between 1.2 and 1.9 mm, typically equal to approximately 1.5 mm. Perforation of said skin is performed using any suitable means known to those skilled in the art, such as a laser, a water jet or a conventional multi-spindle drilling machine. The holes 5 are spaced so that the ratio between the perforated surface and the total surface comprising the holes makes it possible to absorb the desired noise frequency or frequencies.

A double acoustic resonator 4 according to the present disclosure comprises in the thickness direction a first hollow core structure 9a and a second hollow core structure 9b (commonly called "honeycomb" structures), separated by a septum 11 according to the present disclosure, said septum being fixed either on the inner side 13 of the honeycomb core structure 9a, or on the outer side 15 of the honeycomb core structure 9b, or on both the inner side 13 of the honeycomb core structure 9a and the outer side 15 of the honeycomb core structure 9b.

Typically, such a honeycomb core structure 9a, 9b may be made up from a light alloy, such as aluminum, or a material such as Nomex® which corresponds to a polyamide fibers and phenolic resin-based paper.

In addition, each honeycomb core structure 9a, 9b is composed of a plurality of honeycomb units 10a, 10b.

In order to form the first honeycomb core structure 9a (respectively the second honeycomb core structure 9b), at least two honeycomb units 10a (respectively 10b) are connected together by nodal joints according to a direction substantially parallel to the longitudinal axis of the nacelle, said longitudinal axis of the nacelle being substantially perpendicular to the ribbon direction of the first honeycomb core structure 9a (respectively the second honeycomb core structure 9b).

Each honeycomb unit 10a, 10b has substantially the shape of a rectangular plate constituted by a plurality of honeycomb cells 12.

The junction surface formed by the contact surface between the nodal joints of a first honeycomb unit and the nodal joints of a second honeycomb unit is called junction edge 14 of honeycomb units.

The acoustic resonator 4 is called "double" resonator and comprises two honeycomb core structures 9a and 9b enveloping a septum 11 according to the present disclosure. The first honeycomb core structure 9a and the second honeycomb core structure 9b are each connected to the septum 11 by an adhesive 17 or by any other means known to those skilled in the art.

An acoustic skin 3 is fixed to the outer side 16 of the first honeycomb core structure 9a by means of an adhesive 8, for example. A solid skin 6 is also fixed to the inner side 20 of the second honeycomb core structure 9b by an adhesive 18.

The acoustic panel 1 thus formed is called double resonator acoustic panel, said double resonator forming an intermediate layer of said acoustic panel 1, and is intended to be disposed in particular in a turbojet engine nacelle for damping sound waves and thereby attenuating noise pollution thus generated.

According to another form of the present disclosure not shown, a single acoustic resonator comprises a honeycomb core structure on the inner side of which a septum according to the present disclosure is fixed by any means known to those skilled in the art, for example by gluing. The septum according to the present disclosure may occupy all or part of the surface formed by the inner side of the honeycomb core structure.

An acoustic skin is fixed on the outer side of the honeycomb core structure, for example by gluing or using an adhesive.

A solid skin may also be fixed directly on the septum according to the present disclosure, said septum then constituting an inner side of the single acoustic resonator. Said solid skin is fixed by any means known to those skilled in the art, particularly by gluing or using an adhesive.

The acoustic panel thus formed is called single resonator acoustic panel and is intended to be disposed in particular in a turbojet engine nacelle for damping sound waves and attenuating noise pollution thus generated.

Figure 2:
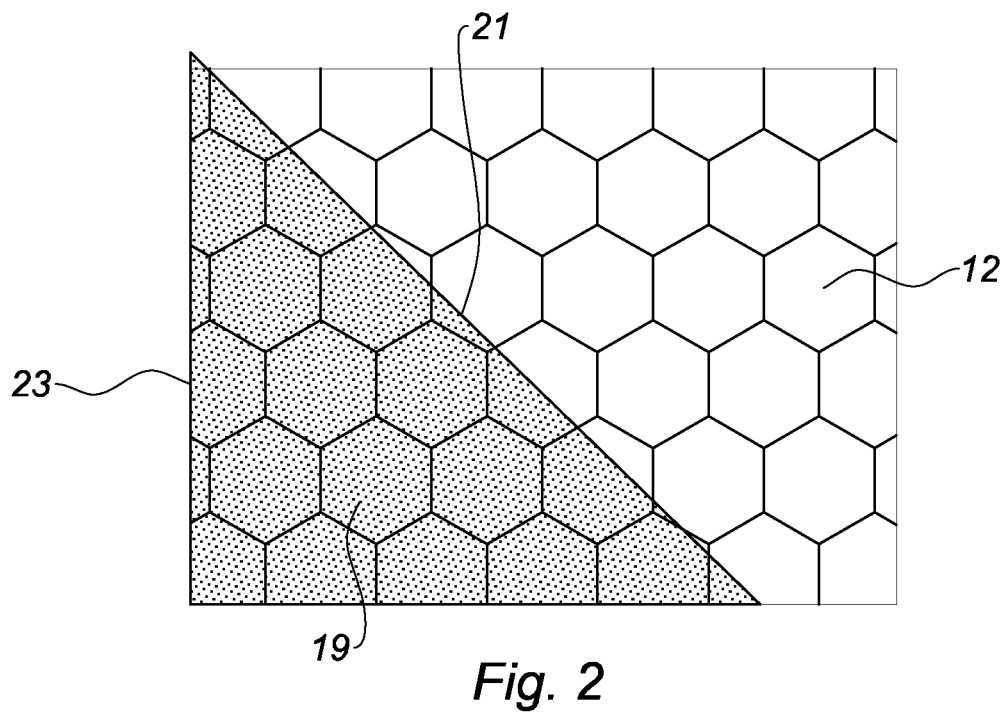
FIG. 2 illustrates a septum plate constituting a septum according to the present disclosure, positioned on a honeycomb core structure.
Figure 3:
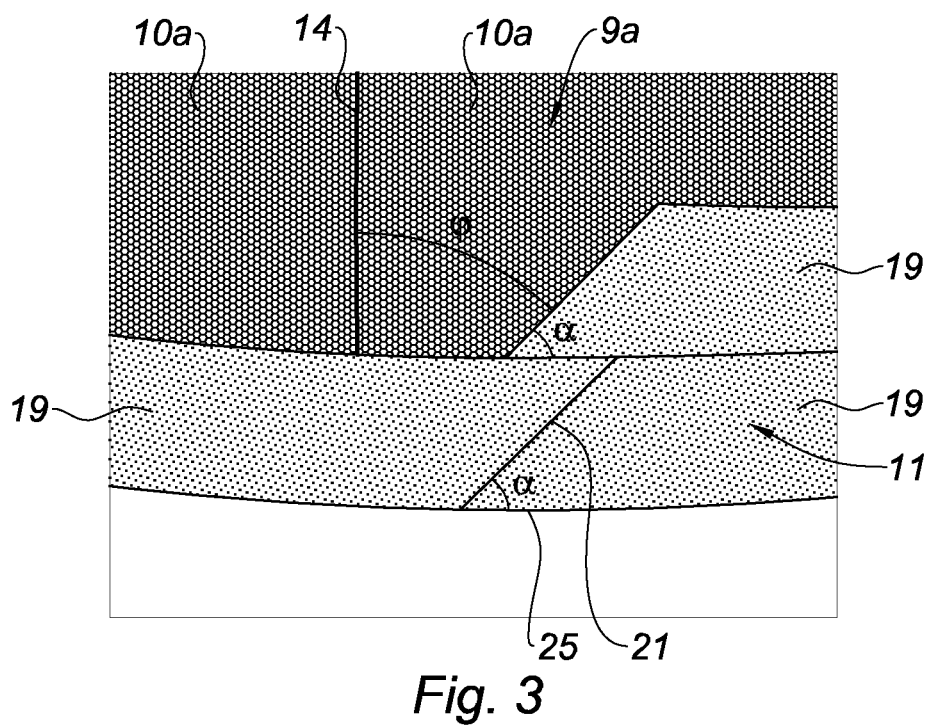
FIG. 3 illustrates septum plates according to the present disclosure, positioned on a honeycomb core structure, specifying the offset between the junction edge of honeycomb units and the junction edge of the septum plates.

According to the present disclosure, with reference to FIGS. 2 and 3, the septum 11 is constituted of several plates 19. At least two plates 19 are required to obtain a septum according to the present disclosure. The septum plates 19 used to carry out the septum according to the present disclosure are advantageously made of glass being mechanically drilled using a method well known to those skilled in the art.

The septum according to the present disclosure comprises several adjacent plates 19, the edges of which are brought into contact at a junction edge 21 of the septum plates 19.

During the manufacture of a resonator or an acoustic panel incorporating the septum according to the present disclosure, the septum plates 19 constituting the septum 11 according to the present disclosure are disposed on a first honeycomb core structure 9a, an edge 23 of a septum plate 19 being disposed collinearly with the ribbon direction of a honeycomb unit 10a, 10b. The septum plates 19 are fixed to the first honeycomb core structure 9a by any means known to those skilled in the art as described above. The second honeycomb core structure 9b is then fixed on the septum 11 by any means known to those skilled in the art as described above. The obtained set thus forms the double acoustic resonator 4.

According to the present disclosure, a septum plate 19 has a junction edge 21 beveled so as to have an angle with one of the adjacent sides 25 thereof of less than 90°.

This advantageous arrangement makes it possible to provide that the junction edge 21 of a septum plate 19 will not be collinear with a junction edge 14 of honeycomb units 10a, 10b upon assembling of the septum plates 19 on a honeycomb core structure 9a, 9b.

Indeed, this feature of the present disclosure makes it possible to lead to an angular offset between a junction edge 14 of honeycomb units 10a, 10b and a junction edge 21 of a septum plate 19.

An advantage of this angular offset, during the step of firing such a septum 11 integral with at least one honeycomb core structure 10a, 10b, is to allow a better dispersion of thermal distortions and to avoid concentration and accumulation of such distortions in one direction and to avoid disbond and offset between a junction edge 21 of a septum plate 19 and a junction edge 14 of honeycomb units 10a, 10b.

Finally, such an arrangement and such an advantage make it possible to overcome problems inherent in the firing of an acoustic panel, which additionally allows for saving time in the manufacturing process, since it is no longer necessary to carry out a repair step after firing the acoustic panel 1 equipped with a septum 11 according to the present disclosure.

Advantageously, the angle between a junction edge 21 of a septum plate 19 and one of the adjacent sides 25 thereof is substantially equal to 45°.

With this feature of the present disclosure, adjusting the septum plates 19 is easier and forces are better distributed on each cell 12 of a honeycomb unit 10a, 10b.

With the present disclosure, the disbond effect between the septum and the honeycomb core structure is removed.

Such an advantage makes it possible to overcome the problems associated with the firing step during the manufacture of an acoustic panel.

It goes without saying that the present disclosure is not limited to the only forms described above by way of examples, but on the contrary it encompasses all the alternative forms.

What is claimed is:

1. A septum comprising at least two septum plates, the edges of which are in contact with each other at least at one beveled junction edge of said septum plates, wherein at least one angle ($\alpha$) between one of said beveled junction edges of the septum plates and one of the sides of said septum plates adjacent to said at least one beveled junction edge is less than 90°.

2. The septum according to claim 1, wherein said at least one angle ($\alpha$) is substantially equal to 45°.

3. The septum according to claim 1, wherein at least one of the septum plates constituting the septum is made of glass.

4. The septum according to claim 3, wherein said at least one of the septum plates constituting the septum is made of drilled glass.

5. A single acoustic resonator comprises a honeycomb core structure on an inner side of which at least one septum according to claim 1 is fixed by connecting means.

6. The single acoustic resonator according to claim 5, wherein the connecting means is glue.

7. A double acoustic resonator comprises a first honeycomb core structure and a second honeycomb core structure, said first and second honeycomb structures being separated by a septum according to claim 1, said septum being fixed to at least one of the first and second honeycomb core structures by connecting means.

8. An acoustic panel for an aircraft nacelle comprises an acoustic resonator according to claim 5, on an outer side of which at least one permeable acoustic skin is fixed.

9. An acoustic panel for an aircraft nacelle comprising an acoustic resonator according to claim 7, on an outer side of which at least one permeable acoustic skin is fixed.

10. The acoustic panel for the aircraft nacelle according to claim 9, wherein at least one impermeable solid skin is fixed on an inner side of the acoustic resonator.

11. A turbojet engine nacelle comprising an acoustic panel according to claim 9.

* * * * *